July 6, 1948.　　　R. B. BRAIDWOOD　　　2,444,889

SAFETY GAS COCK

Filed June 14, 1946

ROBERT B. BRAIDWOOD
*INVENTOR.*

BY Schley and Schley

ATTORNEYS.

Patented July 6, 1948

2,444,889

UNITED STATES PATENT OFFICE 2,444,889

SAFETY GAS COCK

Robert B. Braidwood, Dallas, Tex., assignor of one-half to Bruce N. Spencer, Jr., Dallas, Tex.

Application June 14, 1946, Serial No. 676,693

2 Claims. (Cl. 284—13)

1

This invention relates to new and useful improvements in safety gas cocks.

The invention has to do with the type of gas cock which is provided with a valve for cutting off the flow of gas when the hose is detached from the nozzle and provides certain advantageous improvements.

One object of the invention is to provide a safety attachment to the ordinary gas cock whereby the standard manufactured cock may be equipped without making special castings and without the use of close fitting movable parts.

Another object of the invention is to provide a simple safety gas cock having a spring-pressed cutoff valve therein and provided with a lever pivoted in the nozzle for unseating the valve and having its outer end extending laterally beyond the end of the nozzle so as to be depressed by the hose nipple when the hose is connected to the cock.

A further object of the invention is to provide an improved safety gas cock adaptable for use with all types of gas hose and tubing, such as rubber gas hose, or copper tubing or flexible metallic tubing.

Still another object of the invention is to provide an improved safety gas fitting which possesses all the advantages of the gas cock made in accordance with this invention, and which may be connected to an ordinary gas cock so as to convert the latter to a safety gas cock.

A construction designed to carry out the invention will be hereinafter described together with other features of the invention.

Figure 1:
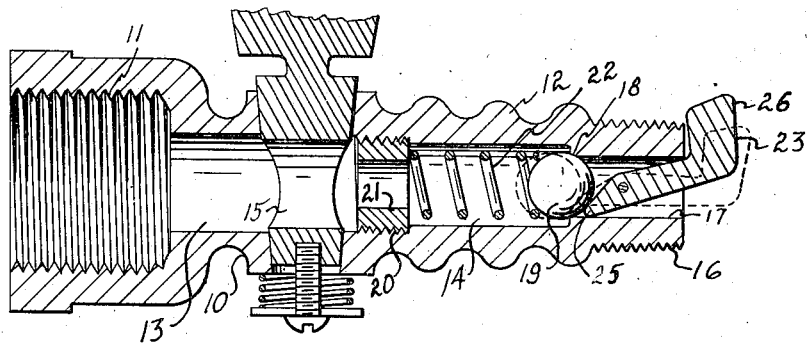
Figure 2:
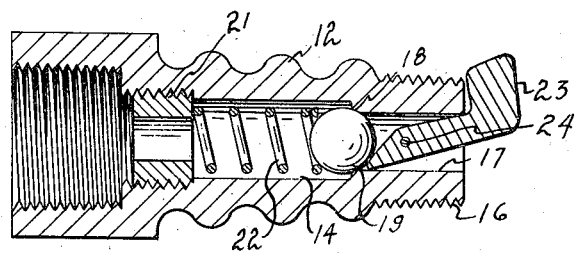
Figure 3:
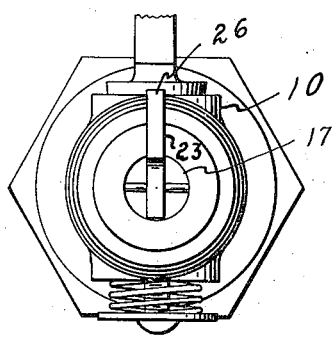

The invention will be more readily understood from a reading of the following specification and by reference to the accompanying drawings, wherein an example of the invention is shown, and wherein:

Fig. 1 is a longitudinal, sectional view of a safety gas cock constructed in accordance with the invention, Fig. 2 is a longitudinal, sectional view of a modified form of the invention, and Fig. 3 is an enlarged outer end elevation of the same.

In the drawings, the numeral 10 designates the body of a standard gas cock having an internally screw-threaded socket 11 at one end by which it is attached to the gas pipe (not shown) and the usual convoluted nozzle 12 at its opposite or outer end. The body is provided with an axial bore 13 extending from the socket which bore is alined with the main bore 14 of the nipple. The usual rotary valve core 15 is mounted in the body

2 to control the flow of gas through the bore 13. It is customary to provide an externally screw-threaded spud 16 on the outer end of the nozzle.

The outer end of the nozzle is provided with a counter-bore 17 co-axially alined with the main bore 14 and forming a continuation thereof. At the intersection of these bores, an annular seat 18 is provided for receiving a valve ball 19. The inner end of the main bore 14 is provided with an internally screw-threaded enlarged bore 20 into which a screw-threaded ring bushing 21 is screwed. A coil spring 22 confined in the bore 14 has its inner end bearing against the bushing and its outer end engaging the ball 19 for holding it on the seat.

An angular lever 23 has one end extending into the counterbore 17 and pivoted on a transverse pin 24 adjacent its inner end. The inner end of the inner lever arm is curved to form a nose 25 which is adapted to engage the ball 19 below its center or at a point offset therefrom, so that when the outer end of the lever 23 is swung downwardly, the nose will force the ball off of the seat 18 and thus permit gas to flow outwardly through the nipple. The outer end of the lever 23 is formed with a rounded boss 26 and extends laterally so that said boss will normally project a substantial distance beyond the circumference of the spud 16.

When the nipple of the usual hose (not shown) is forced onto the nozzle 12, the boss 26 of the lever 23 will be engaged and the said lever swung downwardly to the position shown in dotted lines in Fig. 1. When the lever is swung downward or inwardly, the nose 25 will displace the ball 19 from the seat 18 and hold said ball unseated, whereby the gas may flow freely through the cock to the hose. Should the hose be pulled off of the nozzle either accidentally or intentionally, the spring 22 which is under compression, will move the ball 19 to its seat and thus automatically shut off the escape of gas.

In the form shown in Fig. 2, the medial portion and the valve core 15 are omitted so that the body includes only a socket 27 and the nozzle 12 which is made integral therewith. Otherwise, the construction is the same. The socket 27 is screw-threaded so as to engage the screw-threaded spud, similar to the spud 16, which is provided on nearly all standard gas cocks. Thus, the usual gas cock may readily and quickly be converted to a safety gas cock by screwing the fitting shown in Fig. 2 thereon. The standard gas cock need not be replaced, or any disconnections made in the gas pipes.

The invention is simple and inexpensive because it may be applied to any standard manufacture of gas cock now in common use. However, it would be necessary to bore out the nipple 12 to form the main bore 13 and also to bore out the nipple to form the screw-threaded bore 20. The elements 21, 22, 19, 23 and 24 obviously can be readily applied. It would also be possible to cast the cock with the bore therein and then screw-thread the bore 20. It will be noted that there are no sliding or movable parts which require close machining and the lever could be stamped from heavy sheet metal.

The device may be utilized with any type or style of gas hose or tubing, and will function equally well with rubber hose slipped over the nipple, a copper tubing or flexible metallic tubing secured to the screw-threaded spud. This gas cock is simple and positive in operation, and serves as an additional safeguard against leakage of gas when the valve 15 is closed and no gas hose is connected to the outlet.

The foregoing description of the invention is explanatory and various changes in the size, shape and materials, as well as in the details of the illustrated construction may be made, within the scope of the appended claims, without departing from the spirit of the invention.

What I claim and desire to secure by Letters Patent is:

1. A safety gas cock including, a body having a flow passage therethrough and a nozzle having a main bore and a reduced counterbore at its outer end, said nozzle having a valve seat between its bores, a ring bushing at the inner end of the main nozzle bore, a valve ball movable in the main bore of the nozzle engaging the seat, a coiled spring confined between the bushing and the ball, and an angular lever having one arm extending into the nozzle counterbore and pivoted adjacent the ball and its other arm exterior of the nozzle and extending laterally beyond the end of the nozzle.

2. A safety gas cock including, a body having a flow passage therethrough and a nozzle having a main bore and a reduced counterbore at its outer end, said nozzle having a valve seat between its bores, a ring bushing at the inner end of the main nozzle bore, a valve ball movable in the main bore of the nozzle engaging the seat, a coiled spring confined between the bushing and the ball, and an angular lever having one arm extending into the nozzle counterbore and pivoted adjacent the ball and its other arm exterior of the nozzle and extending laterally beyond the end of the nozzle, said lever having a curved nose at its inner end engaging the ball off center thereof.

ROBERT B. BRAIDWOOD.

REFERENCES CITED

The following references are of record in the file of this patent:

UNITED STATES PATENTS

| Number | Name | Date |
| --- | --- | --- |
| 1,497,054 | Allabach | June 10, 1924 |
| 1,759,872 | Schwimmer | May 27, 1930 |

FOREIGN PATENTS

| Number | Country | Date |
| --- | --- | --- |
| 57,825 | Australia | Feb. 25, 1913 |
| 531,334 | Germany | July 29, 1930 |